United States Patent
Ji

(10) Patent No.: US 10,851,698 B2
(45) Date of Patent: Dec. 1, 2020

(54) EXHAUST GAS GUIDING DEVICE FOR A CONSTRUCTION MACHINE

(71) Applicant: DOOSAN INFRACORE CO., LTD., Incheon (KR)

(72) Inventor: Youngmoo Ji, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 22 days.

(21) Appl. No.: 16/190,783

(22) Filed: Nov. 14, 2018

(65) Prior Publication Data

US 2019/0145299 A1 May 16, 2019

(30) Foreign Application Priority Data

Nov. 14, 2017 (KR) .................. 10-2017-0151777

(51) Int. Cl.
| | |
|---|---|
| *F01N 13/04* | (2010.01) |
| *F01N 13/08* | (2010.01) |
| *F01P 1/06* | (2006.01) |
| *B60K 13/04* | (2006.01) |

(52) U.S. Cl.
CPC ............ *F01N 13/085* (2013.01); *B60K 13/04* (2013.01); *F01N 13/082* (2013.01); *F01P 1/06* (2013.01); *B60Y 2200/41* (2013.01); *F01N 2590/08* (2013.01)

(58) Field of Classification Search
CPC ... F01N 13/082; F01N 13/085; F01N 2590/08
See application file for complete search history.

(56) References Cited

U.S. PATENT DOCUMENTS

| | | | | |
|---|---|---|---|---|
| 8,286,422 | B2 * | 10/2012 | Yang ................... | F01N 1/14 60/298 |
| 2013/0233432 | A1 * | 9/2013 | Tanaka ................ | F16L 9/19 138/114 |
| 2014/0020638 | A1 | 1/2014 | Park | |

(Continued)

FOREIGN PATENT DOCUMENTS

| | | |
|---|---|---|
| CN | 103459788 A | 12/2013 |
| CN | 107218110 A | 9/2017 |

OTHER PUBLICATIONS

Chinese Office Action dated Aug. 4, 2020, in connection with the Chinese Patent Application No. 201811353119.1.

*Primary Examiner* — Audrey K Bradley
(74) *Attorney, Agent, or Firm* — Hauptman Ham, LLP

(57) ABSTRACT

An exhaust gas guiding device includes an exhaust passageway, an exhaust pipe and an exhaust cover. The exhaust passageway is formed in a bonnet of the construction machine to connect an engine room with an exterior of the construction machine. The exhaust pipe is connected to the exhaust passageway. The exhaust cover is installed at the exhaust passageway to protrude from the bonnet to guide the exhaust gas to the exterior. The exhaust cover having a cylindrical shape connected to the exhaust passageway includes a cover body and an exhaust portion. The exhaust portion is slantly connected to the cover body to guide the exhaust gas in an extending direction of the exhaust portion. The exhaust pipe is positioned adjacent to an inner surface of the cover body. The exhaust pipe has a central axis away from a central axis of the exhaust cover.

11 Claims, 6 Drawing Sheets

(56) References Cited

U.S. PATENT DOCUMENTS

2014/0106659 A1\* 4/2014 Hong ..................... B60K 13/04
                                                                  454/162
2015/0377192 A1\* 12/2015 Nathak .............. F02M 35/0216
                                                                  123/184.21

\* cited by examiner

EXHAUST GAS GUIDING DEVICE FOR A CONSTRUCTION MACHINE

CROSS-RELATED APPLICATION

This application claims priority under 35 USC § 119 to Korean Patent Application No. 10-2017-0151777, filed on Nov. 14, 2017 in the Korean Intellectual Property Office (KIPO), the contents of which are herein incorporated by reference in their entirety.

BACKGROUND

1. Field

Example embodiments relate to an exhaust gas guiding device for a construction machine. More particularly, example embodiments relate to an exhaust pipe for exhausting an exhaust gas generated from an engine of a construction machine, and an exhaust gas guiding device including the exhaust pipe.

2. Description of the Related Art

Generally, an exhaust gas generated from an engine of a construction machine may be exhausted through an exhaust pipe. The exhaust pipe may be connected with the engine. The exhaust pipe may be connected to an exhaust passageway formed at a bonnet to connect an interior and an exterior of the construction machine with each other. The exhaust pipe may also be connected to an exhaust cover.

According to related arts, the exhaust cover may include an exhaust portion for refracting a flow direction of the exhaust gas, which may be exhausted through the exhaust pipe, at an acute angle with respect to a vertical direction of the bonnet. The exhaust gas blown from the exhaust pipe may be refracted by the exhaust cover. A stagnation point where a part of the exhaust gas may counter flow, not flow toward an exit of the exhaust cover, may be generated in the exhaust cover. The exhaust gas stagnated at the stagnation point may counter flow into the construction machine, for example, an engine room.

SUMMARY

Example embodiments provide an exhaust gas guiding device that may be capable of preventing a counterblow of an exhaust gas.

According to example embodiments, there may be provided an exhaust gas guiding device for a construction machine. The exhaust gas guiding device may include an exhaust passageway, an exhaust pipe and an exhaust cover. The exhaust passageway may be formed in a bonnet of the construction machine to connect an engine room of the construction machine with an exterior of the construction machine. The exhaust pipe may be connected to the exhaust passageway to exhaust an exhaust gas generated from an engine to the exterior of the construction machine. The exhaust cover may be installed at the exhaust passageway. The exhaust cover may be protruded from the bonnet to guide the exhaust gas discharged from the exhaust gas to the exterior of the construction machine. The exhaust cover may include a cover body and an exhaust portion. The cover body may have a cylindrical shape connected to the exhaust passageway. The exhaust portion may be slantly connected to an upper end of the cover body to guide the exhaust gas in an extending direction of the exhaust portion. The exhaust pipe may be positioned adjacent to an inner surface of the cover body. The exhaust pipe may have a central axis may be spaced apart from a central axis of the exhaust cover.

In example embodiments, the inner surface of the cover body may be remote from an exhausting direction of the exhaust gas in the extending direction.

In example embodiments, the exhaust gas guiding device may further include at least one counterblow-preventing member arranged on an inner surface of the exhaust pipe to interfere with the exhaust gas discharged from the exhaust pipe.

In example embodiments, the counterblow-preventing member may include a first tab protruded from a first portion of the inner surface of the exhaust pipe toward a center of the exhaust pipe, and a second tab protruded from a second portion of the inner surface of the exhaust pipe opposite to the first portion toward the center of the exhaust pipe.

In example embodiments, the first tab and the second tab may be positioned on a diameter line of the exhaust pipe substantially perpendicular to the extending direction of the exhaust cover.

In example embodiments, the counterblow-preventing member may be positioned at an uppermost end of the exhaust pipe connected to the exhaust passageway.

In example embodiments, the exhaust pipe may have a diameter shorter than that of the exhaust passageway. A cooling air for cooling the engine through the bonnet may be introduced into the exhaust cover through a gap between the exhaust passageway and the exhaust pipe.

According to example embodiments, there may be provided an exhaust gas guiding device for a construction machine. The exhaust gas guiding device may include an exhaust pipe and at least one counterblow-preventing member. The exhaust pipe may be connected to an exhaust passageway, which may be formed in a bonnet of the construction machine, to exhaust an exhaust gas generated from an engine to an exterior of the construction machine. The exhaust cover may be installed at the exhaust passageway. The counterblow-preventing member may be protruded from an inner surface of the exhaust pipe to interfere with the exhaust gas discharged from the exhaust pipe, thereby preventing a counterblow of the exhaust gas.

In example embodiments, the exhaust gas guiding device may further include an exhaust cover. The exhaust cover may be installed at the exhaust passageway and protruded from the bonnet to guide the exhaust gas discharged from the exhaust gas in an extending direction of the exhaust cover. The exhaust cover may include a cover body and an exhaust portion. The cover body may be connected with an upper end of the exhaust pipe through the exhaust passageway. The exhaust portion may be slantly connected to an upper end of the cover body to guide the exhaust gas in the extending direction inclined to a flow direction of the exhaust gas at an acute angle.

In example embodiments, the counterblow-preventing member may include a first tab protruded from a first portion of the inner surface of the exhaust pipe toward a center of the exhaust pipe, and a second tab protruded from a second portion of the inner surface of the exhaust pipe opposite to the first portion toward the center of the exhaust pipe. The first tab and the second tab may be positioned on a diameter line of the exhaust pipe substantially perpendicular to the extending direction of the exhaust cover.

In example embodiments, the first tab and the second tab may be positioned at an uppermost end of the exhaust pipe.

In example embodiments, the counterblow-preventing member may have a plate shape having a first length measured along an axial direction of the exhaust pipe, and a second length measured along a radius direction of the exhaust pipe. The first length may be shorter than the second length.

According to example embodiments, the exhaust pipe may be eccentrically arranged with respect to the central axis of the exhaust cover toward a direction opposite to an exhausting direction of the exhaust gas refracted by the exhaust cover. Thus, the exhaust gas may be concentrated on the slant surface of the exhausting portion to readily exhaust the exhaust gas. Although an external air may counter flow into the exhaust cover through the exit of the exhaust cover, the exhaust gas may be readily exhausted from the exhaust cover.

Further, the counterblow-preventing member on the inner surface of the exhaust pipe may generate an axial vortex in the exhaust pipe. The vortex may generate a large deformation of the exhaust gas to suppress the counterblow of the exhaust gas into the construction machine.

BRIEF DESCRIPTION OF THE DRAWINGS

Example embodiments will be more clearly understood from the following detailed description taken in conjunction with the accompanying drawings.

FIG. 1 is a perspective view illustrating an exhaust gas guiding device for a construction machine in accordance with example embodiments;

FIG. 2 is a perspective view illustrating an exhaust pipe of the exhaust gas guiding device in FIG. 1;

FIG. 3 is a cross-sectional view illustrating the exhaust gas guiding device in FIG. 1;

FIG. 4 is a plan view illustrating the exhaust pipe in FIG. 2;

FIGS. 5 and 6 are a side picture and a plan picture showing flows of an exhaust gas in the exhaust gas guiding device without a counterblow-preventing member;

FIGS. 7 and 8 are a side picture and a plan picture showing flows of an exhaust gas in the exhaust gas guiding device with a counterblow-preventing member;

FIG. 9 is a graph showing an induced amount of a cooling air with respect to heights of the exhaust pipe; and FIG. 10 is a graph showing a counterblow amount of the exhaust gas with respect to heights of the exhaust pipe.

DETAILED DESCRIPTION OF THE EMBODIMENTS

Figure 1:
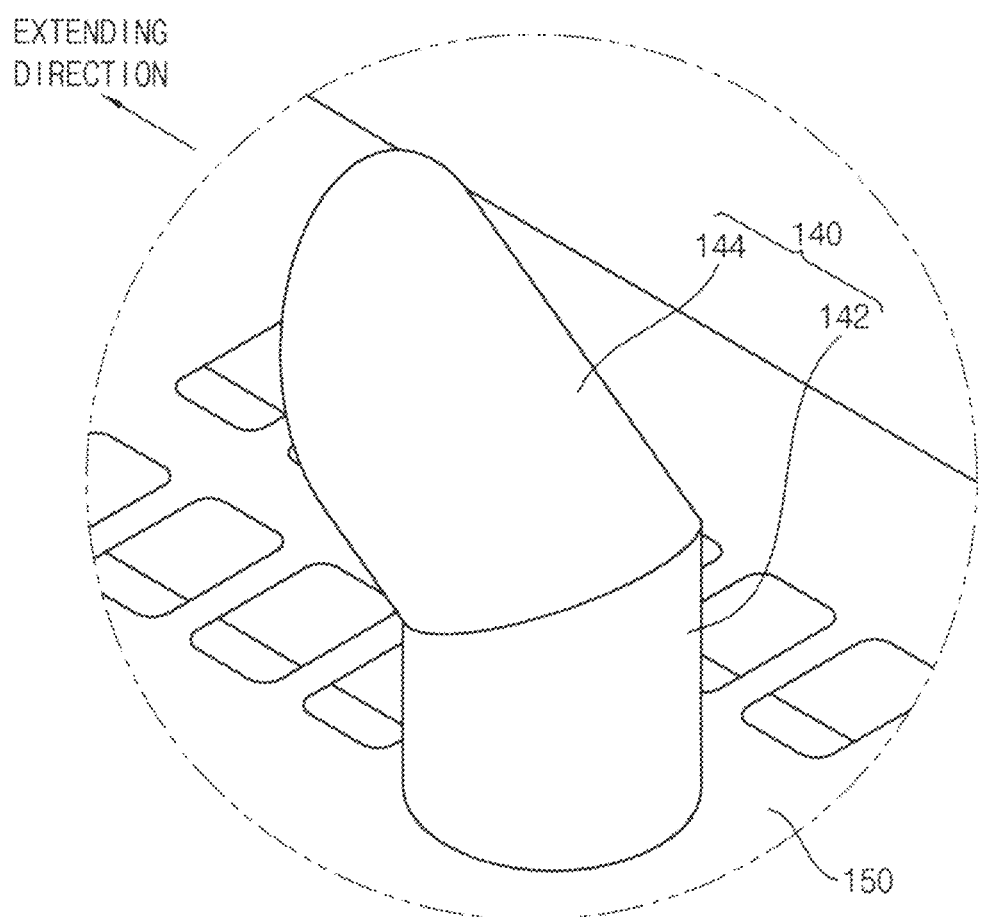
FIGS. 1 to 10 represent non-limiting, example embodiments as described herein.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
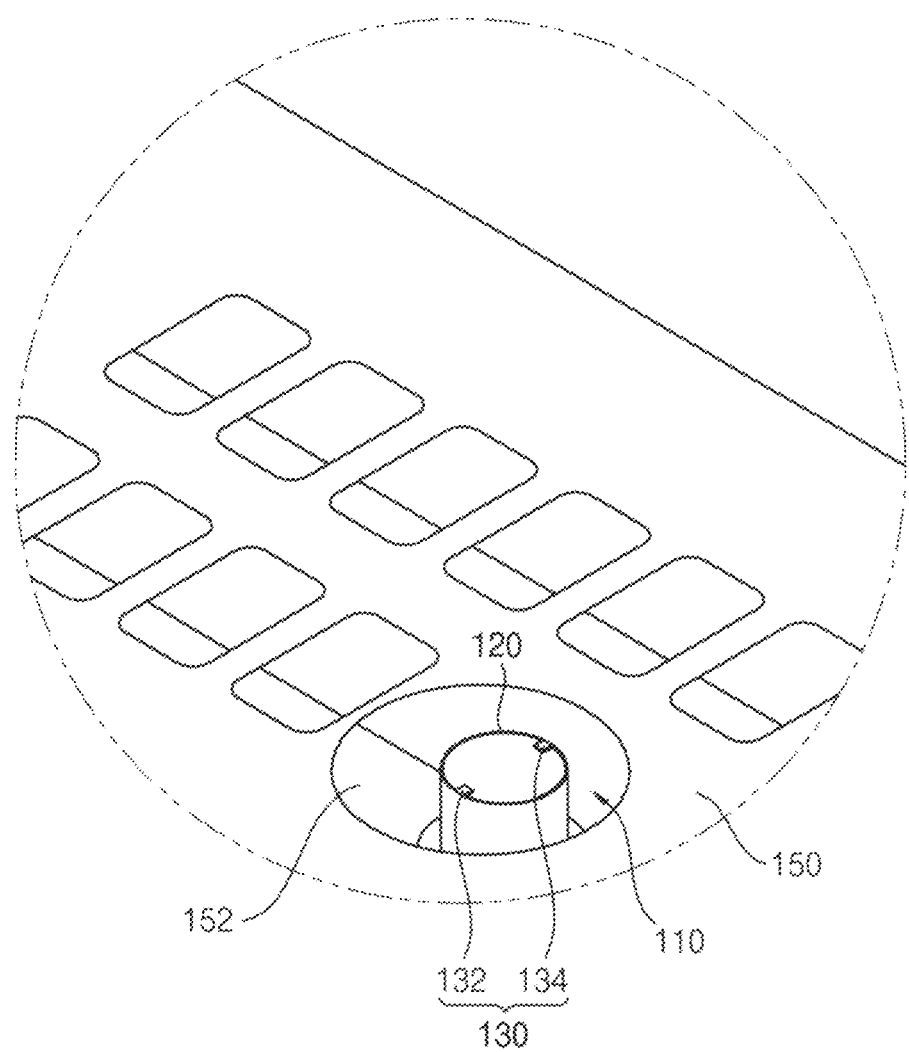
Figure 3:
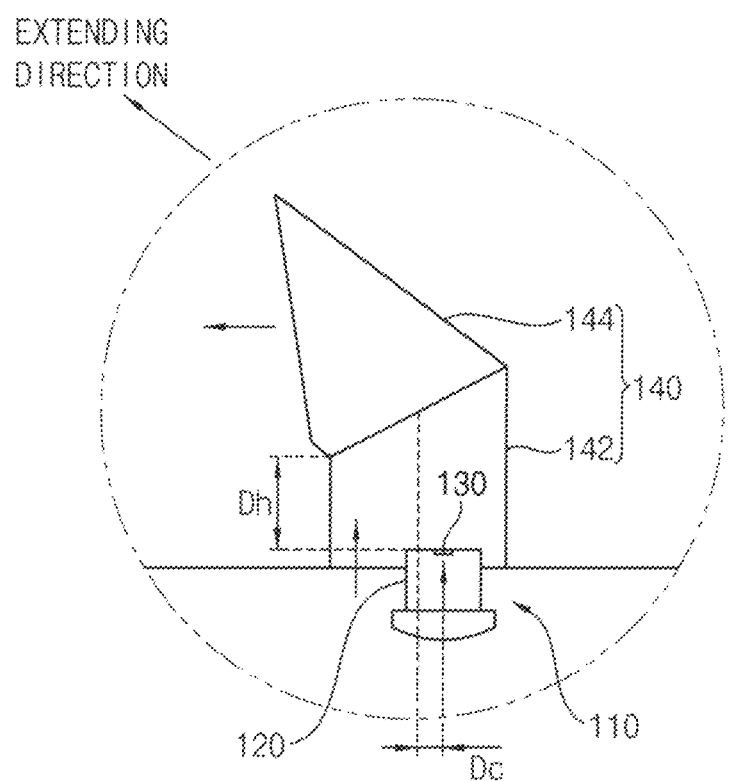
Figure 4:
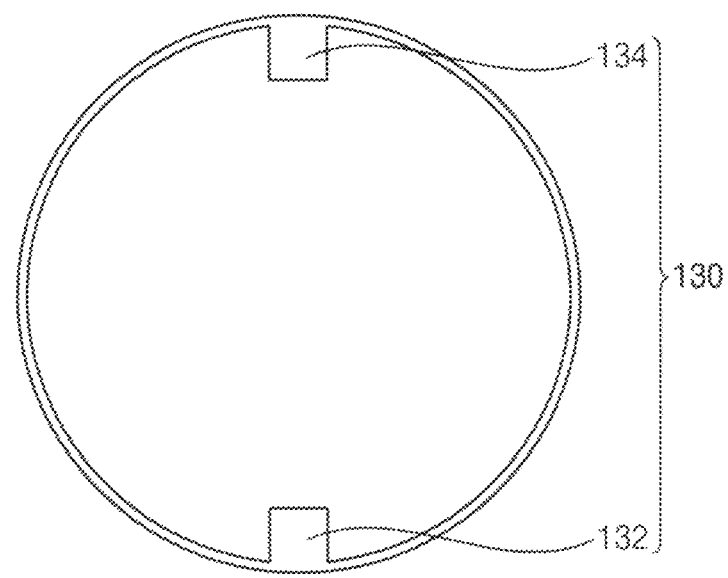

FIG. 1 is a perspective view illustrating an exhaust gas guiding device for a construction machine in accordance with example embodiments, FIG. 2 is a perspective view illustrating an exhaust pipe of the exhaust gas guiding device in FIG. 1, FIG. 3 is a cross-sectional view illustrating the exhaust gas guiding device in FIG. 1, and FIG. 4 is a plan view illustrating the exhaust pipe in FIG. 2.

Referring to FIGS. 1 to 4, an exhaust gas guiding device for a construction machine in accordance with example embodiments may include an exhaust pipe 110 and an exhaust cover 140. The exhaust pipe 110 and the exhaust cover 140 may be installed at a bonnet 150 of the construction machine. The bonnet 150 may have an exhaust passageway 152 connected with an engine room of the construction machine. The exhaust passageway 152 may be vertically formed through the bonnet 150 to connect an interior and an exterior of the construction machine with each other.

The exhaust pipe 110 may be arranged in the exhaust passageway 152. An exhaust gas generated from the engine may be exhausted through the exhaust pipe 110. The exhaust pipe 110 may have a diameter shorter than that of the exhaust passageway 152. Thus, an annular space may be formed between the exhaust pipe 110 and the exhaust passageway 152.

A cooling air may be introduced into the engine room to cool a cooler, a radiator, the engine, etc. The cooling air may be discharged through the annular space between the exhaust pipe 110 and the exhaust passageway 152. The cooling air may be smoothly discharged by flows of the exhaust gas exhausted through the exhaust pipe 110.

The exhaust cover 140 may be arranged on an upper surface of the bonnet 150 to partially cover the exhaust passageway 152. The exhaust cover 140 may be connected to the exhaust passageway 152. The exhaust cover 140 may have a diameter substantially the same as that of the exhaust passageway 152. The exhaust gas and the cooling air may be discharged through the exhaust cover 140.

The exhaust cover 140 may include a cover body 142 and an exhaust portion 144. The cover body 142 may have a cylindrical shape. The cover body 142 may be arranged on the upper surface of the bonnet 150 to cover the exhaust passageway 152. The cover body 142 may be connected to the exhaust passageway 152. The exhaust portion 144 may be connected to an upper end of the cover body 142. The exhaust portion 144 may be extended from the upper end of the cover body 142 at an acute angle with respect to an axial direction of the exhaust passageway 152. The axial direction of the exhaust passageway 152 may correspond to the flow direction of the exhaust gas. That is, the cover body 142 may be slantly connected with the exhaust portion 144 so that the exhaust cover 140 may refract the exhaust gas along an extending direction in FIG. 1. Further, the exhaust portion 144 may cover the exhaust pipe 110 in the cover body 142 to block the exhaust pipe 110 and the exhaust passageway 152. The exhaust cover 140 may prevent vertically moved substances such as rains from infiltrating into the exhaust pipe 110.

A bent connection portion between the cover body 142 and the exhaust portion 144 may correspond to a stagnation point where the exhaust gas may be stagnated. The exhaust gas vertically moved in the exhaust pipe 110 may collide against the bent connection portion between the cover body 142 and the exhaust portion 144 so that the exhaust gas may be stagnated at the bent connection portion. The stagnation of the exhaust gas may hinder the flow of the exhaust gas discharged from the exhaust pipe 110. Further, the stagnation of the exhaust gas may cause a counterblow of the exhaust gas through the annular space between the exhaust passageway 152 and the exhaust pipe 110.

The exhaust pipe 110 may include a pipe body 120 and a counterblow-preventing member 130. The pipe body 120 may be arranged in the exhaust passageway 152. The pipe body 120 may be connected with an exhaust manifold of the engine to discharge the exhaust gas generated in the engine therethrough. The pipe body 120 may have an upper end slightly protruded from the upper surface of the bonnet 150. The pipe body 120 may be eccentrically arranged from a central axis of the exhaust cover 140 by a gap Dc so that the pipe body 120 may be positioned adjacent to a first portion of an inner wall in the cover body 142 of the exhaust cover 140. The inner surface of the exhaust cover 140 may have a first surface remote from the exhaust hole formed through the exhaust portion 144 in the extending direction of the exhaust portion 144, and a second surface opposite to the first surface and adjacent to the exhaust hole.

As mentioned above, the exhaust pipe 110 may not make contact with the first portion of the inner wall in the exhaust cover 140 to suppress vibrations of the exhaust pipe 110 from being transferred to the exhaust cover 140. The exhaust pipe 110 may have an upper end inserted into the cover body 142 through the exhaust passageway 152. The upper end of the exhaust pipe 110 may be spaced apart from a lowermost portion among connection portions between the cover body 142 and the exhaust portion 144 by a gap Dh. In example embodiments, the gap Dh may be longer than the diameter of the exhaust pipe 110. The inner surface of the exhaust cover 140 may have a first surface remote from the exhaust hole formed through the exhaust portion 144 in the extending direction of the exhaust portion 144, and a second surface opposite to the first surface and adjacent to the exhaust hole.

The counterblow-preventing member 130 may function as to form a vortex in the exhaust gas discharged from the exhaust pipe 110. The counterblow-preventing member 130 may be protruded from the inner wall of the exhaust pipe 110.

In example embodiments, the counterblow-preventing member 130 may include a first tab 132 and a second tab 134. The first tab 132 and the second tab may be arranged spaced apart from each other by a uniform gap, for example, about 180° on the inner wall of the pipe body 120. The first tab 132 and the second tab 134 may be positioned at an upper end of the pipe body 120. The first tab 132 and the second tab 134 may be extended toward a central portion of the exhaust pipe 110. However, when the first tab 132 and the second tab 134 may be too much extended to a central portion of the exhaust pipe 110, the vortex in the exhaust pipe 110 generated by the first tab 132 and the second tab 134 may be weakened so that the function of the counterblow-preventing member 130 may be reduced. Thus, the first tab 132 and the second tab 134 may be positioned on a diameter line among diameter lines of the pipe body 120 substantially perpendicular to the flow direction of the exhaust gas. That is, the first tab 132 and the second tab 134 may be substantially perpendicular to the flow direction of the exhaust gas.

The first tab 132 and the second tab 134 may form a pair of the vortexes in the exhaust gas rotated along opposite directions. The pair of the vortexes may form a deep curved region in a rapid shear layer of the exhaust gas to deform the flow of the exhaust gas. Thus, the counterblow of the exhaust gas into the construction machine through the exhaust passageway 152 may be suppressed.

In example embodiments, the counterblow-preventing member 130 may include the two tabs 132 and 134. However, the counterblow-preventing member 130 may include one tab or at least three tabs for forming the vortex. As shown in FIG. 3, the counterblow-preventing member 130 may have a plate shape having a first length, i.e., a thickness measured along an axial direction of the exhaust pipe 110, and a second length measured along a radius direction of the exhaust pipe 110. The first length may be shorter than the second length. When the counterblow-preventing member 130 may have a thick thickness, the exhaust gas may slightly interfere with the counterblow-preventing member 130. In this case, the exhaust gas may be stabilized so that the vortex in the exhaust pipe 110 may have low intensity. The counterblow-preventing member 130 may have other shapes as well as the square shape. For example, counterblow-preventing member 130 may have a triangular shape, a rectangular shape protruded toward the center of the exhaust pipe 110, etc.

Figure 5:
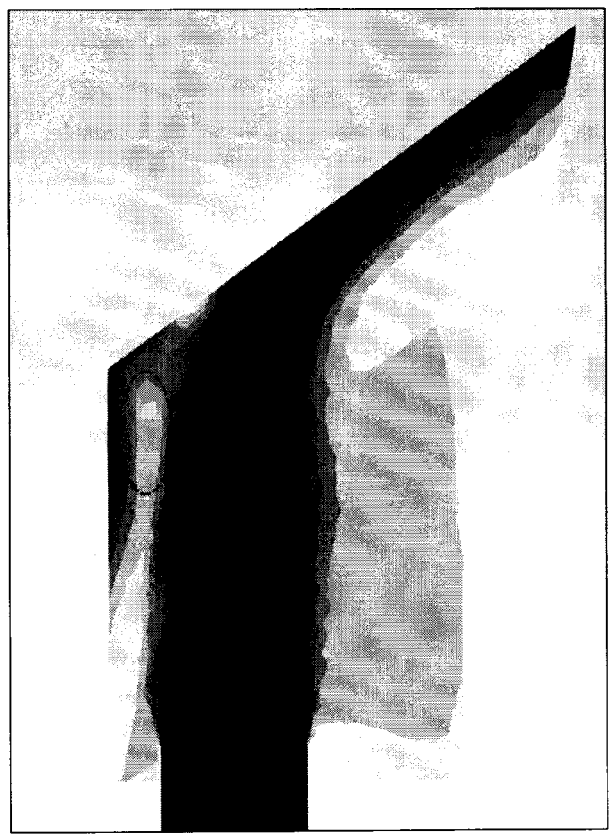
Figure 6:
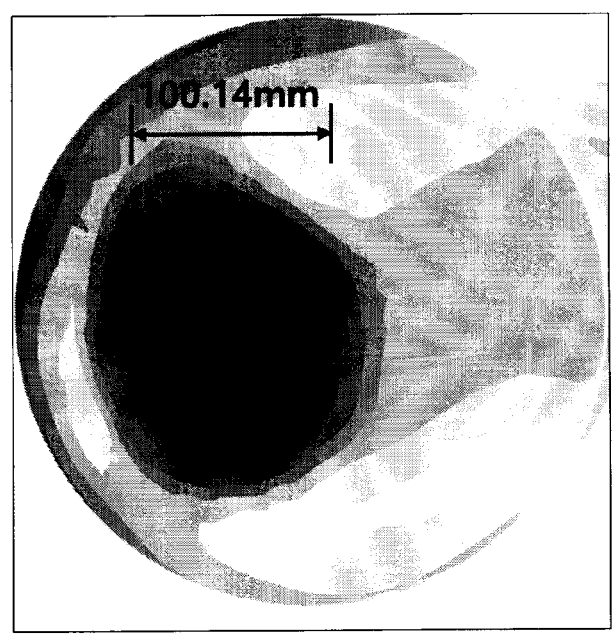

FIGS. 5 and 6 are a side picture and a plan picture showing flows of an exhaust gas in the exhaust gas guiding device without a counterblow-preventing member.

Referring to FIGS. 5 and 6, the exhaust gas may collide against the inner surface of the exhaust portion 144 so that the exhaust gas may counter flow through a gap between the exhaust pipe 110 and the exhaust passageway 152, particularly a narrowest gap between the exhaust pipe 110 and the exhaust passageway 152. As mentioned above, the exhaust gas counter flowing through between the exhaust pipe 110 and the exhaust passageway 152 may flow into the construction machine through a side surface of the exhaust pipe 110. The counterblow of the exhaust gas may be increased proportional to narrowing a width of the flow of the exhaust gas ascending just after discharging from the exhaust pipe 110. As shown in FIG. 6, when the exhaust gas guiding device may not include the counter flow-preventing member, the width of the flow of the ascending exhaust gas may be about 100.14 mm. Because a gap between the inner surface of the cover body 142 and the ascending exhaust gas may be so wide, the counter flow of the exhaust gas may be easily generated.

Figure 7:
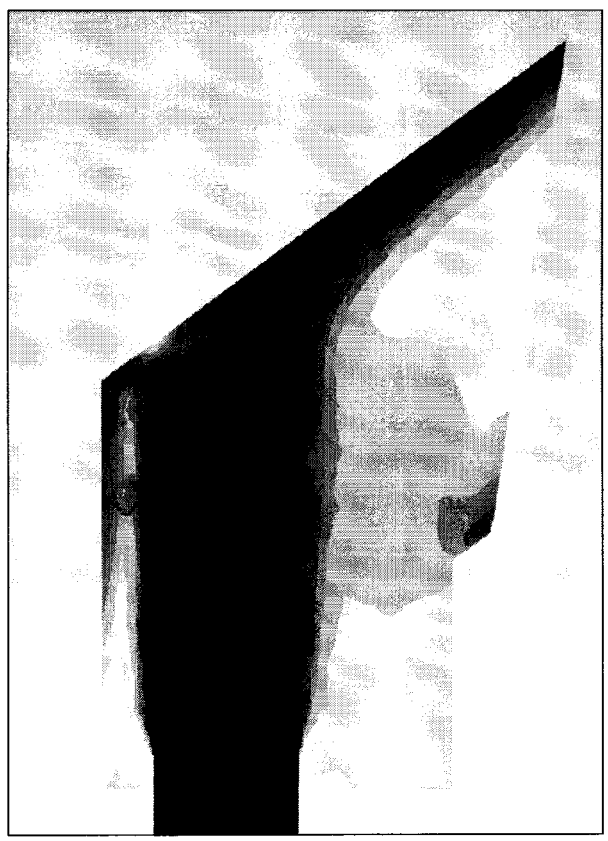
Figure 8:
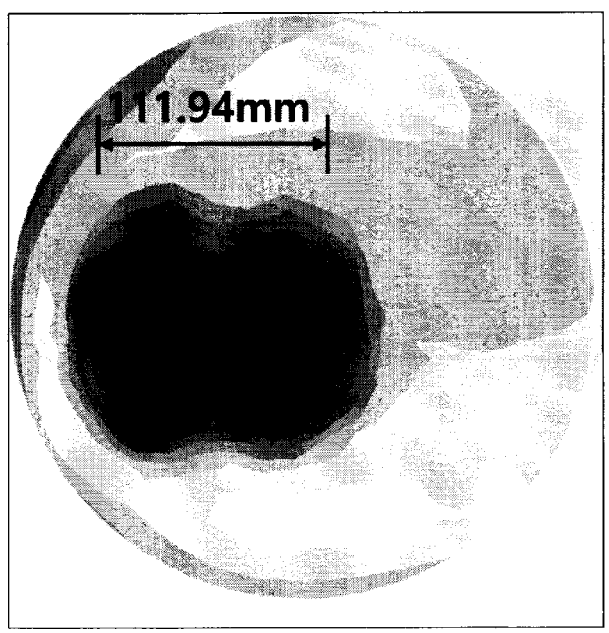

FIGS. 7 and 8 are a side picture and a plan picture showing flows of an exhaust gas in the exhaust gas guiding device with a counter flow-preventing member.

Referring to FIGS. 7 and 8, it can be noted that the flow width of the ascending exhaust gas may become wider by the vortex generated by the counter flow-preventing member. For example, the flow width of the ascending exhaust gas may be about 111.94 mm wider than the flow width of the ascending exhaust gas of about 100.14 mm. When the flow width of the exhaust gas may have the wide width, the gap between the inner wall of the cover body 142 and the ascending exhaust gas with the counter flow-preventing member may be narrower than that measured without the counter flow-preventing member. Thus, it can be noted that the counter flow-preventing member may function as to suppress the counter flow of the exhaust gas after colliding against the slant inner surface of the exhaust portion 144.

Figure 9:
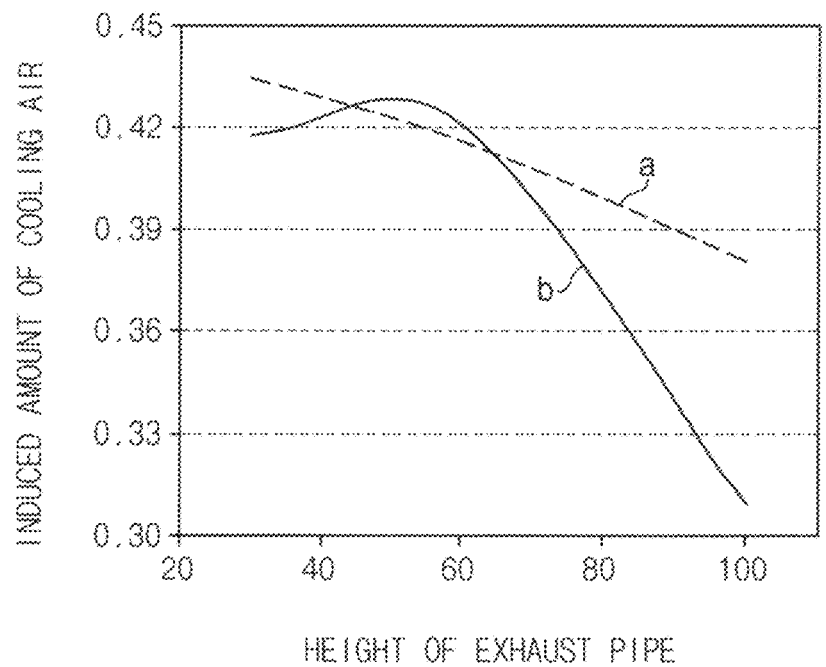

FIG. 9 is a graph showing an induced amount of a cooling air with respect to heights of the exhaust pipe. In FIG. 9, a horizontal axis may represent heights of the exhaust pipe, and a vertical axis may represent an induced amount of the cooling air. A line a may represent an induced amount of the cooling air in the exhaust pipe without the counter flow-preventing member, and a line b may represent an induced amount of the cooling air in the exhaust pipe with the counter flow-preventing member.

Referring to FIG. 9, as shown the line a, it can be noted that the induced amount of the cooling air may be gradually decreased in proportion to increasing the height of the exhaust pipe without the counter flow-preventing member. In contrast, as shown the line b, it can be noted that the induced amount of the cooling air may be gradually increased when the height of the exhaust pipe may be higher than a set height. Particularly, the induced amount of the cooling air may be greatly decreased when the height of the exhaust pipe may be lower than the set height. Thus, it can be noted that the induced amount of the cooling air may be increased when the height of the exhaust pipe may be higher than the set height to improve cooling efficiency of the engine.

Figure 10:
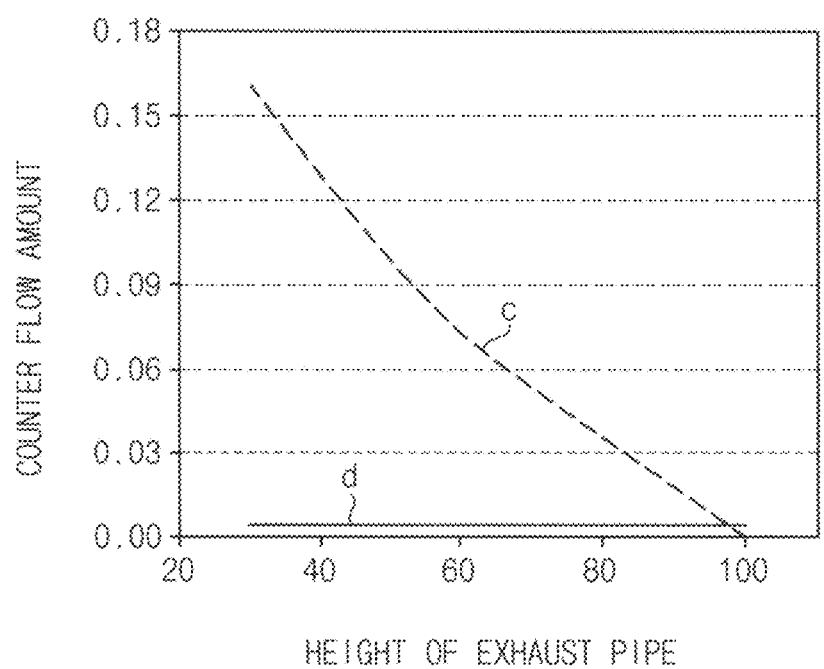

FIG. 10 is a graph showing a counter flow amount of the exhaust gas with respect to heights of the exhaust pipe. In FIG. 10, a horizontal axis may represent heights of the exhaust pipe, and a vertical axis may represent a counter flow amount of the exhaust gas. A line c may represent a counter flow amount of the exhaust gas in the exhaust pipe without the counter flow-preventing member, and a line d may represent a counter flow amount of the exhaust gas in the exhaust pipe with the counter flow-preventing member.

Referring to FIG. 10, as shown the line c, it can be noted that the counter flow amount of the exhaust gas may be gradually decreased in proportion to increasing the height of the exhaust pipe without the counter flow-preventing member. Thus, it can be noted that the exhaust pipe may have a high height in order to suppress the counter flow amount of the exhaust gas in the exhaust pipe without the counter flow-preventing member. However, when the exhaust pipe may have the high height, as shown in FIG. 9, although the counter flow of the exhaust gas may be decreased by reducing the induced amount of the cooling air, the cooling efficiency of the engine may become lower.

In contrast, as shown the line d, it can be noted that the counter flow amount of the exhaust gas may be low regardless of the heights of the exhaust pipe with the counter flow-preventing member. Thus, when the counter flow-preventing member may be applied to the exhaust pipe, it can be noted that the exhaust gas guiding device may be designed considering only the induced amount of the cooling air, without considering the height of the exhaust pipe in order to suppress the counter flow of the exhaust gas. In example embodiments, as shown in FIGS. 9 and 10, the optimal height of the exhaust pipe may be about 40 mm to about 70 mm.

According to example embodiments, the exhaust pipe may be eccentrically arranged with respect to the central axis of the exhaust cover toward a direction opposite to an exhausting direction of the exhaust gas refracted by the exhaust cover. Thus, the exhaust gas may be concentrated on the slant surface of the exhausting portion to readily exhaust the exhaust gas. Although an external air may counter flow into the exhaust cover through the exit of the exhaust cover, the exhaust gas may be readily exhausted from the exhaust cover.

Further, the counter flow-preventing member on the inner surface of the exhaust pipe may generate an axial vortex in the exhaust pipe. The vortex may generate a large deformation of the exhaust gas to suppress the counter flow of the exhaust gas into the construction machine.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An exhaust gas guiding device for a construction machine, the exhaust gas guiding device comprising:
    an exhaust passageway formed at a bonnet of the construction machine to connect an interior and an exterior of an engine room in the construction machine with each other;
    a straight exhaust pipe connected to the exhaust passageway to discharge an exhaust gas in the engine room to the exterior of the construction machine; and
    an exhaust cover arranged at the exhaust passageway and protruded from the bonnet to guide the exhaust gas in the straight exhaust pipe to the exterior of the construction machine,
    wherein the exhaust cover comprises a straight cylindrical cover body connected with the exhaust passageway, and an exhaust portion slantly connected to an upper end of the straight cover body to guide the exhaust gas in an extending direction of the exhaust cover, and
    wherein the straight exhaust pipe is arranged adjacent to an inner surface in the straight cover body to have a central axis offset from a central axis of the straight cover body.

2. The exhaust gas guiding device of claim 1, wherein the straight exhaust pipe has a diameter shorter than that of the exhaust passageway, and a cooling air for cooling the engine is discharged into the exhaust cover through a gap between the exhaust passageway and the straight exhaust pipe.

3. The exhaust gas guiding device of claim 1, wherein a portion of the inner surface in the straight cover body is remote from an exhaust direction of the exhaust gas along the extending direction.

4. The exhaust gas guiding device of claim 3, further comprising at least one counter flow-preventing member arranged on an inner surface of the straight exhaust pipe to interfere with the exhaust gas discharged from the straight exhaust pipe.

5. The exhaust gas guiding device of claim 4, wherein the at least one counter flow-preventing member is positioned at an upper end of the straight exhaust pipe connected to the exhaust passageway.

6. The exhaust gas guiding device of claim 4, wherein the at least one counter flow-preventing member comprises:
    a first tab protruded from a first portion of the inner surface, which is different from the portion of the inner surface in the straight cover body, of the straight exhaust pipe toward a central portion of the straight exhaust pipe; and
    a second tab protruded from a second portion, which is opposite to the first portion, of the inner surface of the straight exhaust pipe toward the central portion of the straight exhaust pipe.

7. The exhaust gas guiding device of claim 6, wherein the first tab and the second tab are positioned on a diameter line of the straight exhaust pipe substantially perpendicular to the extending direction of the exhaust cover.

8. An exhaust gas guiding device for a construction machine, the exhaust gas guiding device comprising:
    an exhaust pipe connected to an exhaust passageway, which is formed at a bonnet of the construction machine, to discharge an exhaust gas of an engine to an exterior of the construction machine; and
    at least one counter flow-preventing member arranged on an inner surface of the exhaust pipe to interfere with the exhaust gas discharged from the exhaust pipe, thereby preventing a counter flow of the exhaust gas,
    wherein
    the at least one counter flow-preventing member has a plate shape horizontally protruded from the inner surface of the exhaust pipe,
    the at least one plate-shaped counter flow-preventing member has a first length measured along an axial direction of the exhaust pipe, and a second length measured along a radius direction of the exhaust pipe,
    the first length is shorter than the second length, and
    the at least one counter flow-preventing member protrudes orthogonal to a central axis of the exhaust pipe.

9. The exhaust gas guiding device of claim 8, further comprising an exhaust cover arranged in the exhaust passageway and protruded from the bonnet to guide the exhaust gas in the exhaust pipe to the exterior of the construction machine in an extending direction of the exhaust cover,
    wherein the exhaust cover comprises a cylindrical cover body connected with an upper end of the exhaust pipe through the exhaust passageway, and an exhaust portion slantly connected to an upper end of the cover body to guide the exhaust gas in the extending direction of the exhaust cover inclined to a flow direction of the exhaust gas at an acute angle.

10. The exhaust gas guiding device of claim 9, wherein the at least one counter flow-preventing member comprises:
    a first tab protruded from a first portion of the inner surface of the exhaust pipe; and
    a second tab protruded from a second portion, which is opposite to the first portion, of the inner surface of the exhaust pipe,
    wherein the first tab and the second tab are positioned on a diameter line of the exhaust pipe substantially perpendicular to the extending direction of the exhaust cover.

11. The exhaust gas guiding device of claim 10, wherein the first and second tabs are positioned at an upper end of the exhaust pipe.

* * * * *